US012703163B2

(12) United States Patent
Robin

(10) Patent No.: US 12,703,163 B2
(45) Date of Patent: Aug. 11, 2026

(54) DEVICE FOR SHAPING A PNEUMATIC TIRE COMPRISING A CONDITIONAL ASSISTANCE SYSTEM FOR THE ROTATION OF THE FLANGES CARRYING THE BEADS OF THE TIRE

(71) Applicant: Compagnie Generale Des Etablissements Michelin, Clermont-Ferrand (FR)

(72) Inventor: Vincent Robin, Clermont-Ferrand (FR)

(73) Assignee: Compagnie Generale Des Etablissements Michelin, Clermont-Ferrand (FR)

( * ) Notice: Subject to any disclaimer, the term of this patent is extended or adjusted under 35 U.S.C. 154(b) by 192 days.

(21) Appl. No.: 18/284,458

(22) PCT Filed: Mar. 17, 2022

(86) PCT No.: PCT/FR2022/050493
§ 371 (c)(1),
(2) Date: Sep. 27, 2023

(87) PCT Pub. No.: WO2022/207993
PCT Pub. Date: Oct. 6, 2022

(65) Prior Publication Data

US 2024/0109262 A1 Apr. 4, 2024

(30) Foreign Application Priority Data

Mar. 29, 2021 (FR) ...................................... 2103191

(51) Int. Cl.
*B29D 30/24* (2006.01)
*B29D 30/26* (2006.01)

(52) U.S. Cl.
CPC .... *B29D 30/245* (2013.01); *B29D 2030/2657* (2013.01)

(58) Field of Classification Search
CPC .................. B29D 30/24; B29D 30/245; B29D 2030/2657; B29D 2030/2664
USPC .......................... 425/28.1; 156/414, 415, 417
See application file for complete search history.

(56) References Cited

U.S. PATENT DOCUMENTS

| | | | |
|---|---|---|---|
| 3,503,829 A | 3/1970 | Menell et al. | |
| 5,211,797 A | 5/1993 | Siegenthaler | |
| 2006/0027310 A1 * | 2/2006 | Auclair ............... | B29D 30/246 156/130.7 |

FOREIGN PATENT DOCUMENTS

| | | |
|---|---|---|
| DE | 1120113 B | 12/1961 |
| EP | 0505813 A1 | 9/1992 |
| WO | 2011019272 A1 | 2/2011 |

* cited by examiner

*Primary Examiner* — Sedef E Paquette
(74) *Attorney, Agent, or Firm* — Dickinson Wright PLLC

(57) ABSTRACT

The device is a drum brake and allows for the shaping of a tire by axial convergence and relative rotation of a first flange carrying the first bead of the tire and a second flange carrying the second bead of the tire. The device applies a law comprising a conditional assistance mode in which assistance with rotation of the flanges is triggered if and only if the angular difference found between the flanges leaves a pre-established permitted region.

7 Claims, 7 Drawing Sheets

10
22
2
20
4
3
21
Z2, Z10
24
23
16
17
12
25
11
9
11
12
15

67
62
63
23

61_3
21
20
22
10
22
20
12
25
24
15
63
62
60
23

61
14

DEVICE FOR SHAPING A PNEUMATIC TIRE COMPRISING A CONDITIONAL ASSISTANCE SYSTEM FOR THE ROTATION OF THE FLANGES CARRYING THE BEADS OF THE TIRE

CROSS-REFERENCE TO RELATED APPLICATION

This application claims priority to and the benefit of PCT Patent Application No. PCT/FR2022/050493 filed on 17 Mar. 2022, entitled "DEVICE FOR SHAPING A PNEUMATIC TIRE COMPRISING A CONDITIONAL ASSISTANCE SYSTEM FOR THE ROTATION OF THE FLANGES CARRYING THE BEADS OF THE TYRE," and French Patent Application No. FR2103191, filed on 29 Mar. 2021, entitled "DEVICE FOR SHAPING A PNEUMATIC TIRE COMPRISING A CONDITIONAL ASSISTANCE SYSTEM FOR THE ROTATION OF THE FLANGES CARRYING THE BEADS OF THE TYRE".

BACKGROUND

1. Field

The present disclosure concerns the general field of production of tires intended to be fitted to vehicle wheels, and more particularly the production of pneumatic tires.

2. Related Art

It is known to produce pneumatic tires using a method comprising a manufacturing step called "flat" production, during which a first annular subassembly of the tire (called the carcass block) is produced by successively winding several components over a cylindrical drum, including at least one carcass ply provided with reinforcing threads which extend axially from one tire bead to the other, then a shaping step during which a radial expansion of the carcass block is provoked, e.g. by inflation, while bringing the beads axially closer together so as to give the carcass block a toroidal form, then a finishing step during which the elements constituting the tire crown, including the tread, are placed on the resulting carcass block.

In certain cases, the shaping step must be accompanied by rotation of the beads relative to one another around the central axis of the drum, because the ply reinforcing threads which are situated in the portions of the carcass block corresponding to the tire sidewalls radialise, i.e. progressively modify their azimuthal orientation around the central axis of the drum in step with the radial expansion of the carcass block, so as to draw closer to and then reach a radial orientation in which the reinforcing threads are carried by radial planes containing the central axis of the drum.

This may be the case in particular if the carcass ply is initially arranged on the drum such that the parallel reinforcing threads it contains are not precisely parallel to the rotational axis of the drum, and are therefore arranged obliquely relative to the generatrix lines of the cylinder, or—when producing a so-called "polarized crown" tire as described in patent FR-1 413 102 filed by the applicant—by arranging, before the shaping step, a reinforcing ply on the carcass ply in the so-called "crown" portion of the carcass ply which is intended to be positioned below the crown of the tire; the reinforcing ply contains mutually parallel reinforcing threads which are oriented relative to the circumferential direction of the drum at a different angle from that of the reinforcing threads of the carcass ply, so that during the radial expansion, the reinforcing threads of the reinforcing ply interact with the reinforcing threads of the crown portion of the carcass ply such that the angles of the different, thus crossing reinforcing threads become modified in the crown zone, while the reinforcing threads of the lateral portions of the carcass ply situated in the flanks are radialised.

During the shaping operation, it is sometimes difficult to satisfactorily match the rotation of the beads with a suitable rotation of the drum flanges so as to ensure correct radialisation of the sidewall reinforcements.

In fact if the flanges are allowed to rotate freely, in order to allow the reinforcements to radialise spontaneously by simple effect of natural twisting of the tire during radial expansion, the final configuration of the reinforcing threads in the sidewalls will be imprecise and difficult to reproduce, since it is difficult to precisely control the azimuthal orientation of the reinforcing threads at the end of the operation, given that the torque which tries to align the reinforcing threads along radial planes diminishes during the radial expansion and is particularly low when the reinforcing threads draw close to a radial orientation.

Conversely, if motorized means are used to control the rotation of the flanges as a function of their axial convergence, such that the flanges are forced to adopt a precise angular position as a function of the distance separating them axially, it is certainly possible to obtain a precise, reproducible and stable radial orientation of the reinforcing threads of the sidewalls in the final toroidal configuration; however, in particular at the start of the radial expansion operation, this tends to hinder the free positioning of the tire components, here the carcass block, with the risk of irreversibly deforming or damaging the components by shearing under torsion, in particular close to the beads.

SUMMARY

The objects of the disclosure are consequently intended to remedy the above-mentioned drawbacks and propose a new device and a new method allowing performance of a tire-respectful, reliable, precise and reproducible shaping operation which involves modification of the azimuthal orientation of the reinforcing threads of the tire sidewalls, and more particularly a radialisation of the reinforcing threads, in particular in the context of so-called "polarized crown" tire production as mentioned above.

The objects of the disclosure are achieved by means of a device for shaping a tire. The device includes a first flange that is intended to receive a first bead of a tire and a second flange that is intended to receive a second bead of the tire. A translation mechanism allows movement of the first flange and/or the second flange in translation along a common central axis in order to modify the so-called "center distance," which axially separates the first flange from the second flange, so that the flanges can be brought axially closer together and hence the beads closer together, to accompany a radial expansion of the tire. A rotation mechanism allows rotation of the first flange and/or the second flange around the central axis so as to allow modification of the relative azimuthal angular position of the first flange relative to the second flange, called the "angular difference." A control system is configured to apply a control law function mode called "conditional assistance mode" in which i) over a first predetermined center distance range called the "first application region", the control law associates with each center distance value of the first application region a range of permitted angular differences, called the "permitted region", which has a predetermined amplitude delimited by a low boundary and a high boundary separate from the low boundary; and in which ii) when a mutual axial convergence of the flanges is performed and the center distance thus passes through the first application region, the rotation mechanism remains passive if the angular difference lies inside the permitted region, so as to allow the first flange and the second flange to rotate freely relative to one another under the effect of the natural reaction of the tire to the radial expansion of the tire and to the mutual axial convergence of the flanges, and the rotation mechanism selectively triggers an assistance with rotation if the angular difference reaches one of the boundaries of the permitted region or leaves the permitted region, in order to actively manage the relative rotation of the flanges so as to force the angular difference to remain in or return within the permitted region.

Advantageously, the disclosure combines the advantages of free natural rotation and controlled rotation, by offering a mixed solution which as far as possible promotes free natural rotation as a default operating mode, but which at all moments has the possibility of activating assistance if necessary in order to pass from free rotation to controlled rotation, and which makes activation of the assistance—i.e. the use of an actuator separate from the tire to exert on one and/or the other of the flanges a force contributing to actively drive the flange in rotation—conditional upon detection of a situation which signals that the tire does not have the intrinsic capacity, under given conditions of flange convergence and radial expansion to which the tire is subjected at the instant concerned, to ensure alone a satisfactory spontaneous orientation of the flanges and hence of the reinforcing threads of the carcass ply.

In fact, the conditional assistance mode according to the disclosure allows assistance with rotation of the flanges to be triggered when and only when the values leave or are about to leave the permitted region, i.e. when and only when it is found that, in the dynamic of the radial expansion movement of the tire and the axial convergence of the beads, the angular positioning of the flanges induced by the natural spontaneous reaction of the tire concerned—and hence the actual angular difference—does not comply with that which would be expected in order to guarantee the physical integrity of the tire and/or a suitable orientation of the reinforcing threads.

In particular, the disclosure allows triggering of assistance with rotation of the flanges when it is detected that the tire alone is not generating sufficient circumferential force at the beads to drive, unassisted, an adequate relative rotation of the flanges, so that the relative rotation of the flanges "trails", i.e. has insufficient amplitude taking into account the level of convergence of the flanges; this may indicate a situation which corresponds either to a weakness or to excessive plasticity of the tire, which consequently cannot exert a sufficiently high rotational torque on the flange without risking its own deformation and damage, or to an insufficient radial alignment torque due to an unfavorable geometric or dimensional configuration, as is typically the case at the end of shaping, at the end of the mutual axial convergence travel of the flanges, when the reinforcing threads of the carcass ply are aligned with the radial planes and effectively no longer exert a lever effect.

Advantageously, the conditional nature of the assistance gives the control system an adaptive nature in that the control system does not blindly impose motorized assistance, which would be reproduced systematically and strictly identically from one tire to the next, but on the contrary makes triggering of assistance subordinate to the fulfilment of certain conditions according to predefined criteria—here a criterion of belonging or not belonging to a permitted region—and thus, case by case, adapts the implementation of possible assistance as a function of the behavior and individual reactions of the tire concerned, and in particular the actual angular difference, as these parameters are effectively established at the time of shaping.

So although, for successive shaping of multiple tires of a same model during a same production series, the control system applies a same standardized control law established for the tire model, the effective progress of shaping and in particular the triggering or not of the assistance, and where applicable the effective point of triggering the assistance—i.e. the center distance value at which the control system will detect a need for assistance (that is, leaving the permitted region) and hence trigger assistance—may vary from one tire of the series to another tire of the same series depending on specific reactions of each tire to the shaping process, and will therefore be "personalized" and hence optimized for each tire individually, from one case to the next.

In particular, it is possible that for a same actual measured center distance value, i.e. a same point of advance of the shaping process, a first tire has a first compliant angular difference situated in the permitted region defined for this center distance value, so that the control system leaves the flanges in free rotation and may sometimes continue the axial convergence of the flanges without triggering assistance, while a second tire of the same model and same series has a second non-compliant angular difference situated at the boundary of or outside the permitted region, so that the control system triggers the assistance in order to force the flanges into a suitable orientation, while in some cases the axial convergence of the flanges continues.

The disclosure therefore allows optimization of the quality of shaping while ensuring perfect respect of the integrity and hence the quality of the tire.

BRIEF DESCRIPTION OF THE DRAWINGS

Further objects, features and advantages of the disclosure will become apparent in more detail on reading the following description and with the aid of the appended drawings, which are provided purely by way of non-limiting illustration, in which.

DESCRIPTION OF EMBODIMENTS

Figure 2:
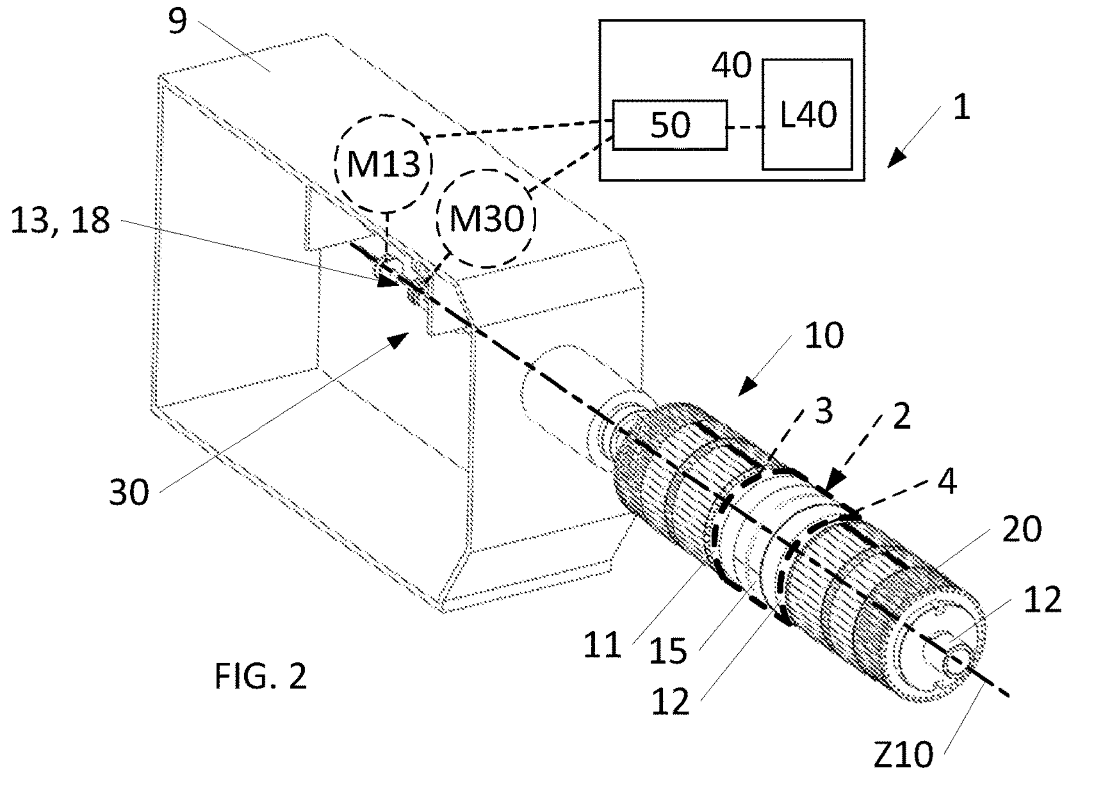
FIG. 2 illustrates, viewed in perspective, a tire shaping device according to the disclosure.

The present disclosure concerns a device 1 for shaping a tire 2, as illustrated in particular on FIG. 2.

The tire 2 is intended for fitting to a vehicle wheel and preferably constitutes a pneumatic tire.

In a manner known in itself, the tire 2 comprises a first bead 3 and a second bead 4 which are intended to allow the tire 2 to grip on a mounting support such as a rim. In this case, the disclosure shows in particular how to produce tires for which the mounting diameter on the rim is between 13 inches and 24 inches, more particularly between 16 inches and 22 inches.

Each bead 3, 4 is provided with a bead core, formed for example from a braid of metal threads or from several reinforcing thread windings wound over one another, such that the bead core forms a non-extensible annular hoop.

In a known fashion, a carcass ply provided with mutually parallel reinforcing threads extends from one bead 3 to the other bead 4, such that the reinforcing threads connect one bead core to the other and thus form part of the reinforcement of the tire 2.

The tire 2 has a shape exhibiting symmetry of revolution about an axis referred to as the “central axis” Z2 which in practice corresponds substantially to the axis of rotation of the wheel on which the tire will be mounted. This central axis Z2 defines three directions conventionally used by those skilled in the art: an axial direction, a radial direction and a circumferential direction.

“Axial direction” is given to mean a direction collinear (i.e. parallel in the vectorial sense) with the central axis Z2 of the tire 2, and hence parallel to the axis of rotation of the tire.

“Radial direction” is given to mean a direction that extends along a radius of the tire, that is, any direction that is secant and perpendicular to the central axis Z2.

“Circumferential direction” is given to mean a direction that is perpendicular both to the axial direction and to a radius of the tire, and which therefore corresponds, in a plane normal to the central axis Z2, to the tangent to a circle centered on the axis of rotation of the tire.

Figure 5:
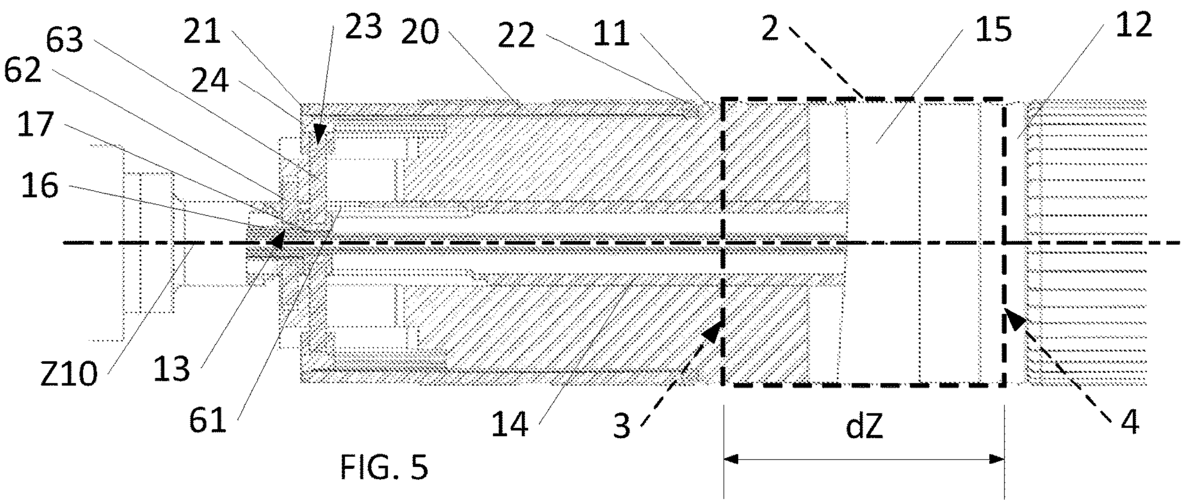
FIG. 5 illustrates, in a detail view with partial section in a vertical radial plane, the shaping device from FIG. 4. This view schematically shows the solid parts of the first flange which have been concealed on other views for better comprehension of the device.
Figure 6:
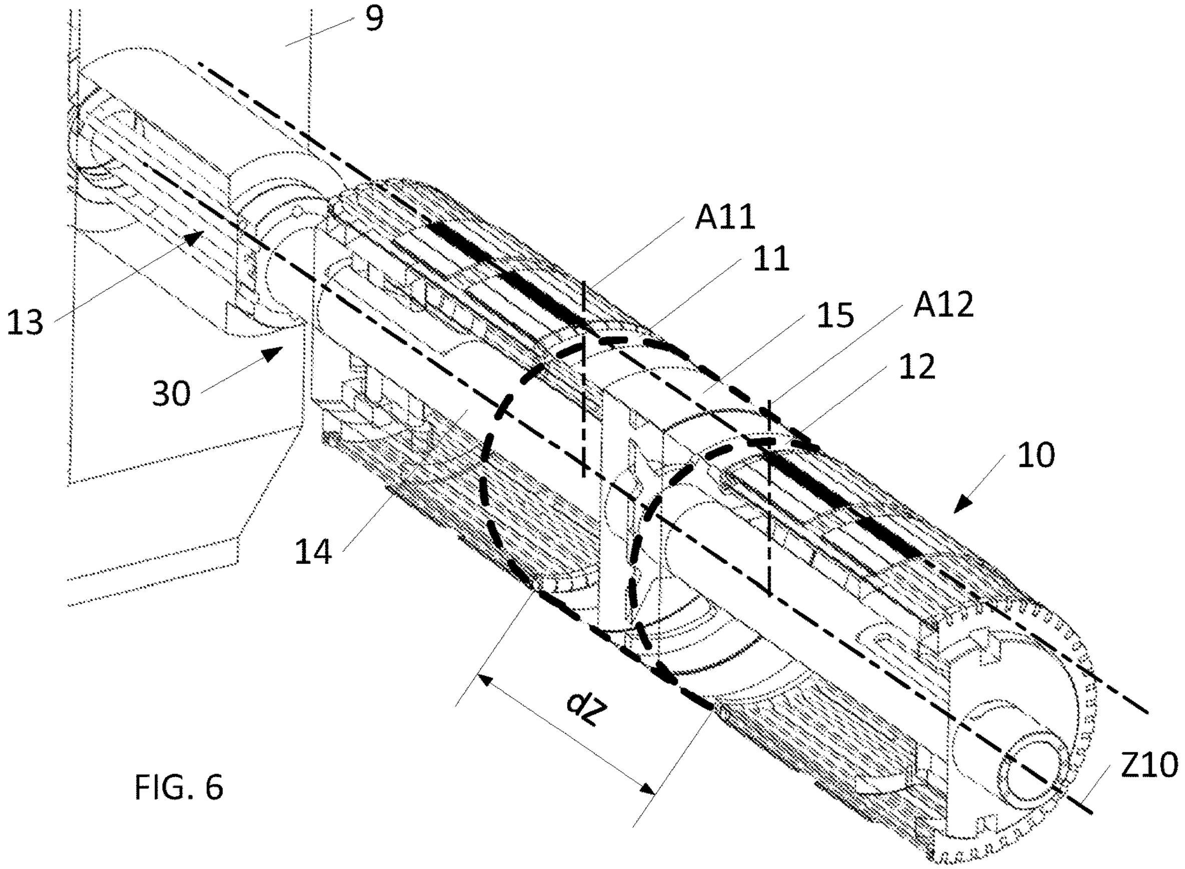
FIG. 6 illustrates, in a perspective exploded view, the shaping device of FIGS. 4 and 5 in an initial configuration corresponding to a center distance value for which the tire is "flat", in a cylindrical form, before the shaping operation.
Figure 16:
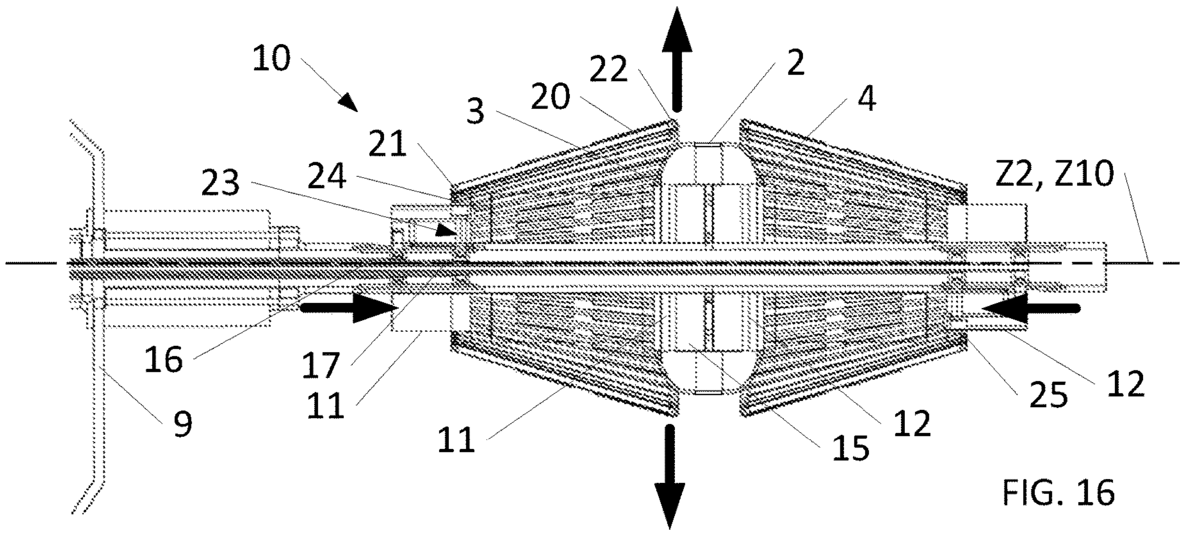
FIG. 16 is a side view, in section in a vertical radial plane containing the central axis of rotation of the flanges, of the device in FIGS. 4, 5, 6, 11 and 14 in a deployment configuration in which pivoting arms carried by the flanges have been radially deployed, wherein the free ends of the arms are provided with rollers so as to fold the edges of the carcass ply over the bead cores of the tire, and press the carcass ply edges against the portions of the carcass ply forming the sidewalls.

The shaping operation consists of causing a radial expansion of the tire 2, here more particularly of a tire subassembly called the “carcass block” comprising at least the carcass ply, for example by injecting into the interior of the tire 2 (here more particularly the interior of the carcass block) a gas under a pressure higher than ambient atmospheric pressure, and by bringing the beads 3, 4 axially together such that the tire 2 (here more particularly the carcass block) changes from an initial configuration in which the tire (here the carcass block) has the form of a straight cylinder, as illustrated in dotted lines in FIGS. 2, 5 and 6, and in which the carcass ply reinforcing threads situated in the tire sidewalls are not radialised, to a final configuration in which the tire 2 (here the carcass block) has a toroidal form as shown on FIG. 16, in which the carcass ply reinforcing threads situated in the tire sidewalls are radialised.

In a known fashion, once the tire 2 (and more precisely the carcass block) has been shaped, a crown block may be attached to the tire 2, comprising at least the tread and in some cases one or more reinforcing elements such as reinforcing plies and/or a hoop formed from a helical winding of circumferential reinforcing turns. The resulting complete tire, also known as the crude tire, is then placed in the curing mold so as to vulcanize the rubber-based components of the tire 2.

For conciseness and ease of description, in the text below the term “tire” 2 may refer to the carcass block intended to undergo the shaping operation, the shaped carcass block resulting from the shaping operation, or the complete tire obtained after assembly of the crown block on the shaped carcass block, depending on context or when there is no need to distinguish between these elements.

According to a preferred possible embodiment, the tire 2 is a polarized crown tire as described initially, for production of which the shaping operation is used in order to modify the orientation of the carcass ply reinforcing threads in the crown zone of the carcass block by applying, before and during the shaping operation, a polarization structure to the portion of the carcass block intended to form the crown zone, wherein the structure may be integrated in the shaping device or formed by a reinforcing ply superposed on the carcass ply and intended to permanently integrate the tire. The polarization structure also comprises mutually parallel reinforcing threads positioned, relative to the circumferential direction of the tire, at a different angle from the angle of the carcass ply reinforcing threads, so as to cause, on radial expansion of the carcass block, a reorientation of the reinforcing threads of the ply in the crown zone. The crown block will then fix the reinforcing threads in the resulting orientation.

In known fashion, the device 1 comprises a frame 9 carrying a drum 10, the drum 10 being mounted rotatably relative to the frame 9 along its central axis Z10 which here corresponds to its longitudinal axis. In practice, the central axis Z10 of the drum coincides with the central axis Z2 of the tire 2 which is being produced and/or shaped on the drum 10, such that, for ease of description, the two axes may be considered jointly under a same reference Z10.

The drum 10 (and hence more generally the device 1) comprises a first flange 11 intended to receive the first bead 3 of the tire 2, and a second flange 12 intended to receive the second bead 4 of the tire 2.

Preferably, as shown in particular on FIG. 5, each flange 11, 12 to this end has an annular groove forming a seat for receiving the elements constituting the first and second beads 3, 4 respectively, here in particular firstly the carcass ply and secondly, in a reproducible position above the carcass ply, a bead core or complex comprising a bead core associated with a rubber insert.

The device 1 also comprises a translation mechanism 13 allowing movement of the first flange 11 and/or second flange 12 in translation along a common central axis Z10, which here corresponds to the central axis Z10 of the drum 10, in order to modify the "center distance" dZ which axially separates the first flange 11 from the second flange 12, and more precisely axially separates the first bead 3 from the second bead 4 of the tire 2, so that the flanges 11, 12 can be brought axially closer together, and hence the beads 3, 4 of the tire 2 closer together, to accompany a radial expansion of the tire 2.

Preferably, the translation mechanism 13, and more generally the drum 10 and hence the device 1, comprises a shank 14 which forms the central axis Z10 and guides the first and second flanges 11, 12 in translation but also in rotation. The shank 14 is itself carried by the frame 9 and mounted in rotation around the central axis Z10 relative to the frame 9.

In the known fashion and as illustrated on FIG. 2, the translation mechanism 13 may comprise a translational drive motor M13, preferably an electric motor, which acts on the flanges 11, 12 in order to move the flanges 11, 12 by sliding along a shank 14, for example (as shown on FIG. 5) by means of rods 16, 17 which are driven in translation by the motor M13, preferably by means of a screw-and-nut movement conversion system 18 housed in the frame 9. The coupling between the flange 11, 12 and the rods 16, 17 may be implemented by means of one or more fingers 62, 63, 64, 65 which will be described in more detail below The center distance value dZ may be measured or evaluated by any suitable means, for example by means of sensors which are associated with the flanges 11, 12 or with the translation mechanism 13 (in particular the drive motor M13 actuating the translation mechanism 13) and which measure the axial position of each of the flanges 11, 12 or enable deduction of the axial position of the flanges 11, 12 from the angular position of the shaft of motor M13.

Also, the drum 10 may comprise a central hoop 15 which sits slidingly on the flanges 11, 12 so as to straddle one end of each flange 11, 12 and thus form a bridge which ensures the continuity of the visible surface of the drum 10 between the two flanges 11, 12. Thus the hoop 15 forms in particular a support for "flat" laying of the components of the carcass block during assembly of the tire 2 on the drum 10, and can accommodate variations in center distance dZ during axial movements of the flanges 11, 12.

Figure 18:
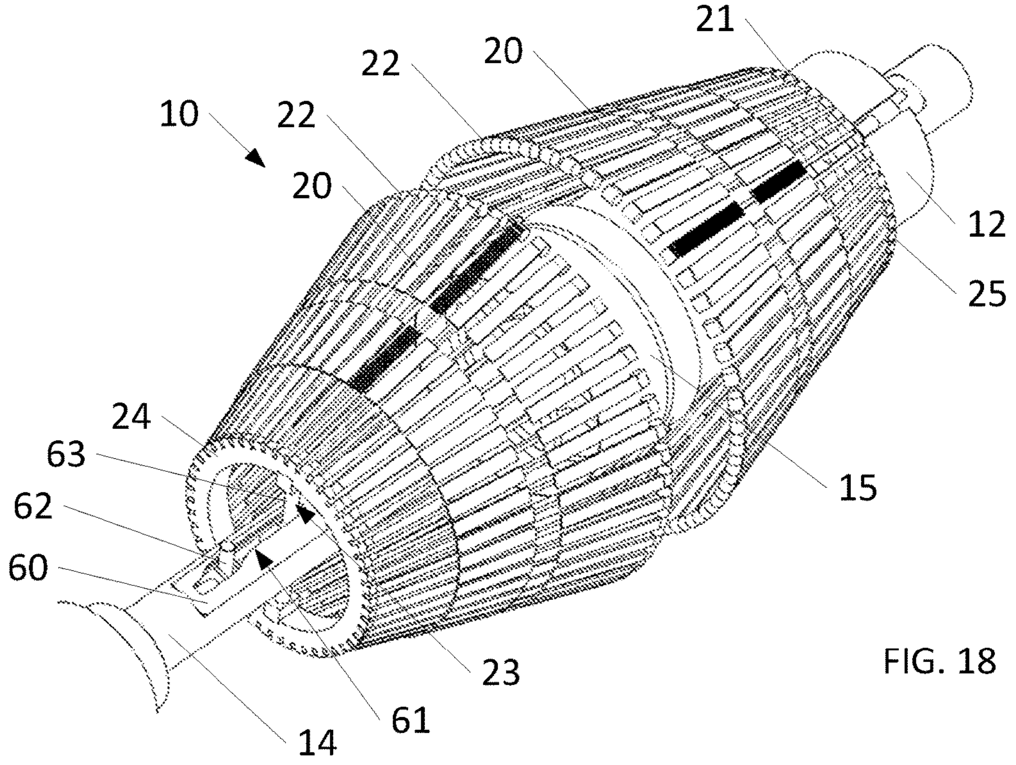
FIG. 18 shows, in a perspective exploded view revealing the mechanical guide associated with the first flange, the device from FIG. 16 in the deployment configuration.

As visible in particular on FIGS. 5, 16 and 18, the drum 10 preferably comprises arms 20 mounted in a star shape on each flange 11, 12 and articulated on each flange 11, 12 by a pivot 21, so they can deploy radially (FIGS. 16 and 18) and retract (FIGS. 2, 4, 5, 6, 11) alternately by pivoting relative to the central axis Z10.

The free ends of the arms 20 carry rollers 22 such that, when the arms 20 are deployed radially and the flanges 11, 12 converge axially, the rollers 22 perform a folding operation which consists of bending, over the bead cores, the carcass ply edges which form the axial ends of the carcass ply and preferably carry one or more components intended to be integrated in the sidewalls of the tire 2, and pressing the edges against the corresponding portions of the carcass ply which will form the sidewalls of the tire 2.

These arms 20 with rollers 22 may also serve to fold and roll the radially outer part of the sidewalls onto the crown block, after laying of the crown block on the shaped carcass block, so as to ensure good cohesion of the crown block with the carcass block, before the crude tire is sent for curing.

Any suitable deployment mechanism 23 may be used for controlling the pivoting of the arms 20. For example, as illustrated on FIGS. 5 and 16, to this end a ring 24, 25 may be provided on the flange 11, 12 concerned, and guided in translation over the flange, the relative axial movement of which ring relative to the flange 11, 12 causes, via a suitable linkage, the pivoting of the arms 20.

Also, the device 1 preferably comprises an inflation system (not shown) designed for injecting a fluid, preferably air, under a pressure greater than ambient atmospheric pressure, into the annular space situated between the flanges 11, 12, the radially outer limit of which is formed by the tire 2 to be shaped. Thus the inflation contributes to the radial expansion of the tire 2 and advantageously holds the tire 2 in its toroidal configuration, in particular during laying of the crown block.

The device 1 also comprises a rotation mechanism 30 which allows rotation of the first flange 11 and/or second flange 12 around the central axis Z10 so as to allow modification of the relative azimuthal position of the first flange 11 relative to the second flange 12, known as the "angular difference" dA.

In practice, if the angular position A11 of the first flange 11 and the angular position A12 of the second flange 12 are measured relative to a same origin and in a common reference system, for example the reference system linked to the frame 9, the angular difference dA represents the algebraic value of the difference between the angular position A11 of the first flange and the angular position A12 of the second flange 12 (taking into account the signs of each of these values): dA=A11−A12.

The angular difference dA may be evaluated or measured by any suitable means, for example by measuring the respective annular positions A11, A12 of the first flange 11 and second flange 12 by means of an angular sensor of the coder or resolver type.

By convention, the angular position A11, A12 of a flange may have a positive sign when it corresponds to an anti-clockwise rotation (trigonometric sense) and a negative sign when it corresponds to a clockwise rotation.

By convention, it may be considered that in the initial configuration, with the tire "flat", the two flanges 11, 12 are aligned on their common angular origin such that the initial angular difference is zero: dA_init=0 deg.

In practice, in the final configuration when the tire 2 is in its toroidal form, and the carcass ply reinforcing threads are radialised, the final angular difference dA_final depends on the architecture and dimensions of the tire 2, in particular the proportion between the radial height of the sidewalls and the width of the crown of the tire. Preferably, the final angular difference dA_final may lie between zero degrees and 30 degrees, and more frequently between 1 degree and 20 degrees, in particular between 5 degrees and 15 degrees.

Figure 1:
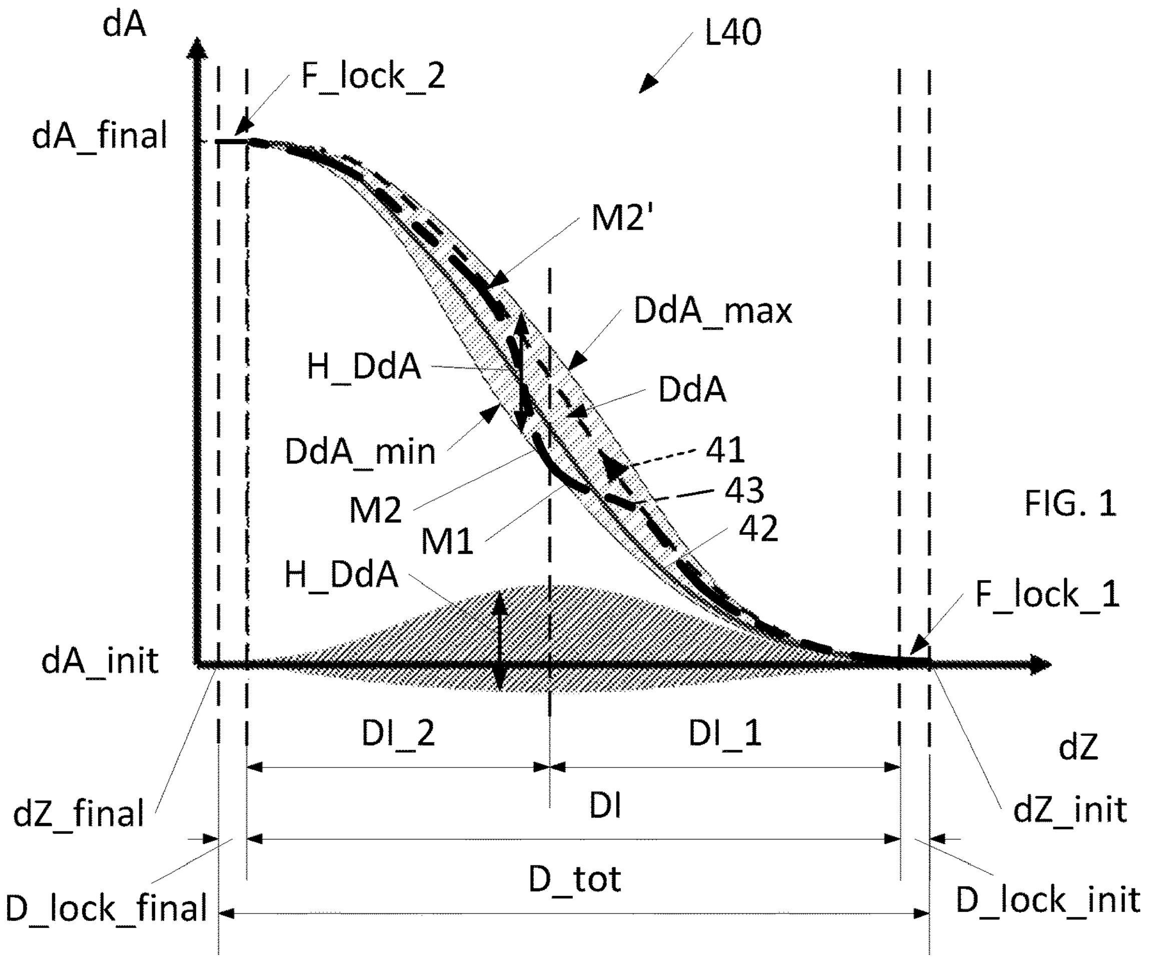
FIG. 1 illustrates a control law according to the disclosure which associates a center distance value on the abscissa with a value or range of values of permitted angular difference on the ordinate.

According to the disclosure, the device 1 comprises a control system 40 configured to apply a control law L40 which, as shown on FIG. 1, comprises a function mode called "conditional assistance mode" in which i) over a first predetermined center distance range called the "first application region" DI, the control law L40 associates with each center distance value dZ of the first application region DI a range of permitted angular differences, called the "permitted region" DdA, which has a predetermined amplitude H_DdA delimited by a low boundary DdA_min and a high boundary DdA_max separate from the low boundary DdA_min; and in which ii) when a mutual axial convergence of the flanges 11, 12 is performed (to pass from the initial configuration to the final configuration) and the center distance dZ thus passes through the first application region DI (and thus travels progressively from one side to the other), the rotation mechanism 30 remains passive if the angular difference dA lies inside the permitted region DdA, so as to allow the first flange 11 and the second flange 12 to rotate freely relative to one another under the effect of the natural reaction of the tire 2 to the radial expansion of the tire 2 and to the mutual axial convergence of the flanges 11, 12, and the rotation mechanism 30 selectively triggers an assistance with rotation if the angular difference dA reaches one of the boundaries DdA_min, DdA_max of the permitted region DdA or leaves the permitted region DdA, in order to actively manage the relative rotation of the flanges 11, 12 so as to force the angular difference dA to remain in or return within the permitted region DdA.

Advantageously, the control law L40 thus provides that for a same center distance value dZ, the device 1 may selectively adopt two states, namely either a state of free rotation or a state of assisted rotation, depending on whether the actual angular difference dA lies inside the permitted region DdA or outside the permitted region DdA.

Advantageously, the control law L40 according to the disclosure therefore allows the flanges 11, 12 to be left floating, i.e. in free relative rotation;

- as long as the actual angular difference dA does not leave the permitted region DdA, wherein it is not necessary to actively correct the angular difference dA by triggering motorized assistance,
- or when it is no longer necessary to maintain a previously triggered assistance because the actual angular difference dA has returned strictly within the permitted region DdA after being temporarily outside (or on the border of) the permitted region DdA, such that the assistance can be deactivated.

The amplitude H_DdA of the permitted region, at the center distance value dZ concerned, defines the tolerance for natural self-regulation allowed for the system formed by the flanges 11, 12 connected by the tire 2.

As indicated above, a same control law L40 therefore has a relative polyvalence, since for each tire 2 concerned, it can individually adapt the duration and intensity of the assistance it provides for rotation of the flanges 11, 12, since the triggering and/or continuation of assistance are conditional on the intrinsic reactions of the tire 2 concerned to the shaping operation.

The triggering, or respectively deactivation, of the assistance may be implemented by any appropriate means such as a mechanical ramp system (see below), controlled clutch engagement, selective application of one or more motors M30 for assistance with rotation, etc.

In this context, it is noted that the rotation mechanism 30 may comprise its own drive motors M30 or draw its motive power from a drive motor M13 of the translation mechanism 13 by means of a suitable movement conversion system.

In all cases, the rotational movement of the flanges 11, 12, more particularly the rotational assistance of the flanges 11, 12, can be synchronized with the axial translation movement of the flanges 11, 12, and more particularly the mutual axial convergence movement of the flanges 11, 12.

The diagram in FIG. 1 illustrates an exemplary control law L40.

On this diagram, a dotted line illustrates an exemplary theoretical development curve 41 which corresponds to a development of the angular difference dA as a function of the center distance dZ deemed optimal for a given model of tire 2 during a shaping operation.

It is noted that this theoretical development curve 41 is not linear and has gentle transitions, starting substantially tangentially to the initial value of the angular difference dA_init, then passing through an inflection point—here situated substantially in the middle of the first application region DI—and then terminating tangentially to the final value of angular difference dA_final, such that the theoretical development curve 41 is substantially S-shaped.

Preferably, the theoretical development curve 41 is at least of class $C^1$, i.e. it is differentiable and its derivative is continuous at least over the interval formed by the first application region DI, and preferably over the total center distance interval D_tot which extends from the initial center distance dZ_init corresponding to the initial configuration up to the final center distance dZ_final corresponding to the final configuration. Thus a shaping following this theoretical development would proceed progressively with no jerks or excessive stresses, and hence respect the integrity of the tire 2.

The theoretical development curve 41 is contained within the permitted region DdA, here hatched, or in places runs along one of its boundaries, here the high boundary DdA_max, of the permitted region DdA.

The boundaries DdA_max, DdA_min also follow curves, preferably at least of class $C^1$, the high boundary DdA_max lying above the theoretical development curve 41 and the low boundary DdA_min lying below the theoretical development curve 41, the boundaries being separated from one another, for each center distance value dZ concerned, by a height which represents the amplitude H_DdA of the permitted region for the center distance value dZ concerned.

The boundaries DdA_max, DdA_min, the theoretical development curve 41 and more generally the control law 40 are preferably monotonous functions, according to which the angular difference dA increases continuously while the center distance dZ diminishes.

The arrow shown on the theoretical development curve 41 indicates the travel direction of the theoretical development curve 41, and hence more generally of the control law L40 during a shaping operation.

The second curve 42 in continuous lines is an example of the actual behavior of a first tire 2 during a shaping operation which proceeds without assistance, because during the shaping operation, the tire 2 reacts such that the actual angular difference dA naturally remains permanently inside the permitted region DdA, such that the control law L40 never triggers the assistance in the first application region DI.

However, the third curve 43 in mixed lines illustrates an example of shaping during which the tire 2 cannot naturally keep the actual angular difference dA within the permitted region DdA, for example because of a "hard point" linked to the occurrence of excessive friction in the rotation mechanism 30 of a flange 11, 12, such that the actual angular difference dA "hits" the boundary, here the low boundary DdA_max, at point M1 on the diagram, triggering the assistance which in this case allows shaping to continue along the low boundary DdA_max so as to maintain an acceptable angular difference dA while the axial convergence continues and hence the center distance dZ diminishes. In the same example, it is noted that once the "hard point" has been passed, the rotation mechanism 30 recovers its fluidity such that the rotation of the flange 11, 12 catches up and the angular difference dA returns inside the permitted region DdA, here at point M2, which causes the withdrawal of the assistance and continuation of shaping with a free rotational movement of the flanges 11, 12.

The second hatched area on the bottom of the diagram in FIG. 1 shows the development of the amplitude H_DdA of the permitted region, and hence of the permitted values of angular difference dA, relative to the theoretical development curve 41 here shown on the axis of the abscissa.

Preferably, the amplitude H_DdA of the permitted region offers the flanges 11, 12 a relative angular displacement and hence a possible angular difference dA which may amount to at least 2 degrees, even at least 5 degrees, and which preferably is also less than 30 degrees, even less than 15 degrees.

In other words, there is at least one value of center distance dZ lying in the first application region DI for which the control law L40 authorizes an angular displacement of the flange 11 relative to the other flange 12 which is equal to at least 2 degrees, preferably at least 5 degrees, while for the entire first application region DI, the authorized angular displacement does not exceed 30 degrees, preferably not exceed 15 degrees.

The angular displacement thus allowed for the flanges 11, 12 is therefore firstly sufficiently great to allow the control system 40 to give preference to free rotation of the flanges 11, 12 as long as this free rotation does not harm the tire 2, and sufficiently small to ensure that the control system 40 triggers the assistance before the occurrence of torsion conditions which could potentially damage the tire 2.

It is also noted that preferably, the amplitude H_DdA of the permitted region varies as a function of the center distance dZ.

Thus the control law L40 can define a non-constant amplitude H_DdA as a function of the center distance dZ, and hence adapt, advantageously progressively, the tolerance of the control system 40 to the degree of shaping of the tire 2 and/or to the non-linear behavior of the tire 2.

For example, the control system 40 may be relatively severe and hence the amplitude H_DdA relatively small at the start of shaping in order to promote the reactivity of the control system 40, so that although the flanges 11, 12 are preferably initially in free rotation, the assistance may be triggered almost instantaneously if the angular difference dA increases too rapidly under the effect of a high torque resulting from the inertia of a flange at the start of rotation (and more globally resulting from a resistance torque opposing the free rotation of the flange), which torque may risk damaging or even destroying the tire 2. The amplitude H_DdA may then increase, and hence the control system 40 become more tolerant and so less prompt in providing motorized assistance, once the rotational movement of the flanges 11, 12 has begun and while the axial convergence is in progress. The control system may thus in particular tolerate variations in angular difference dA which are linked to the visco-elastic behavior of the tire 2 under torsion, and/or to fluctuations in friction hindering the free rotation of the flanges 11, 12. At the end of shaping, the amplitude H_DdA may again be reduced, and hence the control system 40 become more severe again in order to gain precision, by triggering the assistance if the angular difference dA deviates however slightly from the desired target value dA_final, in order to achieve correct radialisation of the reinforcing threads of the tire sidewalls.

Preferably, the permitted region DdA defined by the control law L40 has an amplitude H_DdA which firstly increases while the center distance dZ reduces over a first portion DI_1 of the first application region DI, which first portion DI_1 is situated towards and preferably includes the initial center distance dZ_init corresponding to the initial, substantially cylindrical configuration of the tire 2; then which decreases over a second portion DI_2 of the first application region DI, which second portion DI_2 is situated towards or even includes the final center distance dZ_final corresponding to the final toroidal configuration of the tire 2, such that the angular difference dA converges towards a target final angular difference dA_final corresponding to the desired angular difference in the final configuration.

Thus the region representing the amplitude H_DdA of the permitted region has a bulge in the central portion of the first application region DI, and gives the control system 40 its adaptive nature as described above. Advantageously, the convergence of boundaries DdA_min, DdA_max towards a same target value of final angular difference dA_final, and hence the corresponding reduction in amplitude H_DdA in the second portion DI_2 of the first application region, means that the closer the center distance dZ and tire 2 come to the final configuration, the less the control system 40 tolerates the free angular displacement of a flange 11 relative to the other flange 12, and hence the more easily the control system 40 tends to trigger assistance with rotation in order to control precisely the orientation of the sidewall reinforcing threads.

Preferably, the first application region DI covers at least 50%, preferably at least 75%, even at least 90% of the total center distance interval D_tot described by the center distance dZ during the total axial travel of the flanges 11, 12 which is necessary to cause the tire 2 to pass from an initial, substantially cylindrical configuration to a final configuration corresponding to the desired toroidal form.

Thus advantageously, the control system 40 may prioritize free rotation and apply the principle of conditional assistance over the majority, or even almost the entirety, of the axial travel of the flanges 11, 12, and hence the essence of the shaping operation, and only really apply a constraining control to the flanges 11, 12 at the very end of the axial travel, and sometimes if necessary at the very start of the axial travel.

Also, according to a preferred characteristic which may constitute a totally separate disclosure, the control law L40 comprises at least one rotational blocking function, and preferably comprises two rotational blocking functions, selected from:

i) a first rotational blocking function F_lock_1 which allows blocking of the relative rotation of the flanges 11, 12 in an initial configuration corresponding to an initial center distance value dZ_init or a range of center distance values D_lock_init which precedes the first application region DI and in which the tire 2 has a cylindrical form before the shaping operation, and ii) a second rotational blocking function F_lock_2 which allows blocking of the relative rotation of the flanges 11, 12 in the final configuration corresponding to a final center distance value dZ_final or a range of center distance values D_lock_final which follows the first application region DI, and in which the tire 2 has a desired toroidal form after completion of the shaping operation.

The first rotational blocking function F_lock_1 advantageously allows, when activated, blocking of the rotation of the flanges 11, 12 relative to one another and relative to the shank 14 during the step of flat assembly of the tire, so as to guarantee that the drum 10 behaves as a stable unitary assembly while the components of the carcass block, including at least the carcass ply and bead cores, are laid on said drum 10. The first rotational blocking function F_lock_1 will then be deactivated at the start of the shaping operation, so as to allow the relative rotation of the flanges 11, 12.

The second rotational blocking function F_lock_2 advantageously allows blocking of the relative rotation of the flanges 11, 12 at the end of the shaping operation so as to ensure a stable support of the beads 3, 4 of the tire 2 during the attaching and fixing of the crown block. comprising the tread, to the shaped tire 2 (here the carcass block), or while performing rolling operations by means of the arms 20.

The blocking functions F_lock_1, F_lock_2 which can thus be activated on either side of the first application region D1, respectively before the start of the axial travel necessary for shaping and at the end of the axial travel necessary for shaping, may be implemented by any suitable means for blocking rotation of a flange 11, 12 relative to the shank 14, including for example a mechanical friction brake, a mechanical lock, a managed clutch system, control of a rotational motor as a motor brake, or a specific arrangement of guide ramps etc.

It is noted that, graphically, in view of the characteristics above, the boundaries DdA_max, DdA_min may preferably, like the theoretical development curve 41, follow S-shaped curves which at their starting point dZ_init have a tangent to the initial center distance value dA_init, which tangent is horizontal and preferably common to both boundaries, then a progressive development with an inflection point, then a convergence towards a tangent at the final center distance value dA_final, here again a tangent which is horizontal and preferably common to both boundaries, as shown on FIG. 1.

According to a first possible embodiment, the control law L40 takes an electronic form, preferably the form of a set of numerical data such as a mathematical formula, a map, a chart or a table, and is made available to a computer 50 of the control system 40 which manages one or more motors M13, M30 actuating the translation mechanism 13 and the rotation mechanism 30, as illustrated on FIG. 2.

Advantageously, such a solution in particular allows simple programming or reprogramming of the control law L40 to adapt the device 1 to each new model of tire 2 to be shaped, without needing to modify the mechanical elements of the drum 10.

It also allows evolution of the control law L40 as a function of various parameters applicable to the shaping operation, in particular as a function of the inflation pressure selected to cause the radial expansion of the tire 2.

According to this first possible embodiment, to perform a shaping of the tire 2, the computer 50 manages the translational drive motor M13 in order to force the axial convergence of the flanges 11, 12, evaluates the corresponding center distance dZ, for example by measuring or evaluating the axial position of each flange 11, 12 by means of sensors integrated in the translation mechanism 13, and at the same time evaluates the angular difference dA at each moment, for example by measuring the respective angular positions A11, A12 of the flanges 11, 12 by means of suitable sensors. The computer 50 may thus, at each considered instant, compare the actual operating point (dZ, dA), i.e. the point of which the coordinates (on the graph of FIG. 1) are the actual center distance dZ on the abscissa and the actual angular difference dA on the ordinate, with the permitted region DdA defined by the control law L40, and thus decide:

either to continue the axial convergence by leaving the flanges 11, 12 in free relative rotation if the actual operating point (dZ, dA) lies within the permitted region DdA, or to trigger assistance for controlling the relative rotation of the flanges 11, 12 if the actual operating point (dZ, dA) reaches or crosses a boundary DdA_min, DdA_max of the permitted region, in order to compensate for the inadequacy of the natural rotation of the flanges, and thus keep or return the operating point within the permitted region DdA.

Activation of the assistance by the computer 50 following an electronic, virtual control law L40 may depend on the nature of the rotation mechanism 30.

Preferably, the rotation mechanism 30 may be provided with one or more specific drive motors M30 which are separate from the translational drive motor M13. In this case, when the computer 50 decides to trigger assistance, it may selectively activate the rotational drive motor(s) M30 to provide a torque for assistance with rotation of the flanges 11, 12, and/or control the angular position A11, A12 of the flanges. The control system 40 which applies the electronic control law L40 may thus act as an "electric cam" which adjusts the intensity of the assistance and the amount of rotational displacement of the flanges 11, 12 as a function of the center distance value dZ, and where applicable as a function of the rate of development of the center distance dZ, and hence as a function of the management of the rotational drive motor M13, according to a synchronization ratio (between the translational drive motor M13 and the rotational drive motor(s) M30) which may be defined and adjusted for any center distance value dZ by the control law L40.

Preferably, such a rotation mechanism 30 may comprise a clutch managed by the computer 50, and able to adopt selectively either an engagement configuration in which the clutch provides a connection between the rotational drive motor M30 and the flange concerned so as to provide assistance with the relative rotation of the flanges 11, 12, or a release configuration in which the clutch separates the flange 11, 12 from the drive motor M30 and more particularly disconnects the flange 11, 12 from the kinematic chain comprising the drive motor M30 and its associated reduction gear, so as to release the relative rotation of the flanges 11,

12 and more particularly prevent the motor M30 and its reduction gear from applying a resistant torque which could hinder the free rotation of the flange 11, 12 concerned.

In all cases, the computer 50, and hence more generally the control system 40 applying the electronic control law L40, may advantageously apply a threshold system in order to avoid oscillations which may result from over-rapid alternation between assistance triggering and subsequent assistance withdrawal, because the operating point (dZ, dA) is immediately adjacent to a boundary of the permitted region DdA and hence to the limit of necessity of assistance.

Thus for example, if assistance is triggered when the operating point, situated in the permitted region DdA, reaches a boundary DdA_min, DdA_max of the permitted region (point M1 on FIG. 1), then assistance may be maintained until the operating point returns strictly within the permitted region DdA at a predefined threshold (angular) distance from the boundary DdA_min, DdA_max relative to which assistance was triggered, and/or at a predefined threshold (angular) distance from the boundary DdA_min, DdA_max which is closest to the operating point (dZ, dA) at the moment concerned.

According to one possibility, the assistance may be maintained until this actual operating point (dZ, dA) reaches the theoretical development curve 41, i.e. the computer 50 uses the theoretical development curve 41 as a setpoint for activating the assistance, and manages the rotation of the flanges 11, 12 according to this setpoint. According to the diagram of FIG. 1 and with reference to the shaping operation illustrated by the third curve 43, the active assistance will be maintained from a point M1 at which assistance is triggered at the low boundary DdA_min of the permitted region, until a point M2' of intersection of the third curve 43 with the theoretical development curve 41, from which point M2' assistance will be again deactivated.

Once assistance has enabled the flanges 11, 12 to correct their angular position so as to return to an acceptable angular difference dA, for example the angular difference dA provided by the theoretical development curve 41 for the actual center distance dZ in progress, then the computer 50 and more generally the control system 40 may deactivate the assistance to restore the relative freedom of rotation of the flanges 11, 12.

According to a second possible embodiment which may constitute a completely separate disclosure, the control law L40, instead of being electronic and hence virtual, is implemented by a mechanical guide 60 which corresponds to a guide groove 61 holding by engagement a finger 62, 63, 64, 65 fixed to one of the flanges 11, 12, as shown in particular on FIGS. 3, 4, 5, 6, 7, 8, 10, 12, 13, 14, 15, 16, 17, 18.

Figure 3:
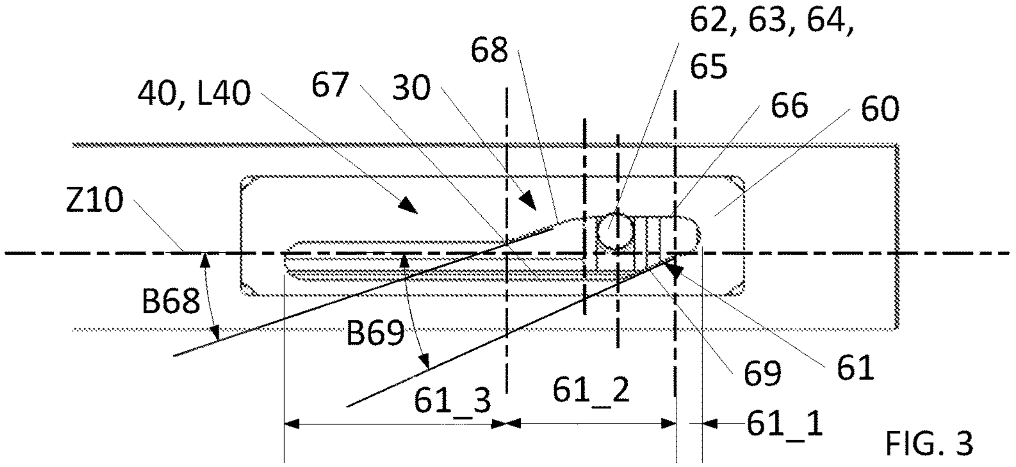
FIG. 3 illustrates a mechanical guide using a groove which implements the control law by guiding a finger fixed to a flange.
Figure 4:
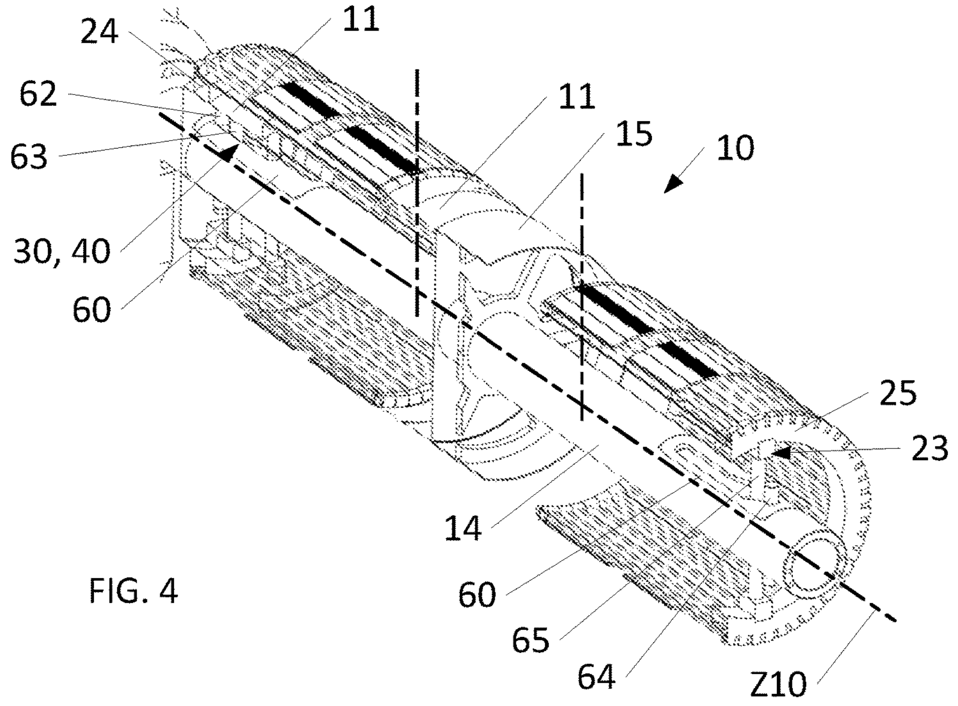
FIG. 4 illustrates, in a perspective exploded view, a variant of the shaping device from FIG. 2 in which each of the first and second flanges is guided by a mechanical guide with a groove according to FIG. 3.

As clearly shown on FIG. 3 and then on FIGS. 7, 10, 12, 15 and 17, the guide groove 61 has side edges which form, against the finger 62, 63, 64, 65 concerned, guide profiles 66, 67, 68, 69 allowing an axial movement of the finger 62, 63, 64, 65 on modifications of the center distance dZ, while forming the azimuthal boundaries of the permitted region DdA around the center axis Z10, so as firstly to offer the finger 62, 63, 64, 65 and hence the corresponding flange 11, 12, in each of the axial positions of the finger 62, 63, 64, 65 and hence of the flange 11, 12, an angular displacement RA which corresponds to the amplitude H_DdA of the permitted region for the axial position concerned, and secondly to retain the finger 62, 63, 64, 65 within the permitted region DdA by forming circumferential stops against the azimuthal rotation of the finger 62, 63, 64, 65 and hence of the corresponding flange 11, 12 when the finger 62, 63, 64, 65 reaches an azimuthal position which corresponds to one of the boundaries DdA_min, DdA_max of the permitted region.

More particularly, the guide groove 61 may comprise:

- a first guide profile 66 which corresponds to the angular position of the flange 11, 12 in the initial configuration with non-radialised reinforcing threads, the first guide profile 66 preferably taking the form of a first straight flat section parallel to the central axis Z10;
- a second guide profile 67 which corresponds to the angular position of the flange 11, 12 in the final configuration with radialised reinforcing threads, the second guide profile 67 preferably taking the form of a second straight flat section parallel to the central axis Z10 and offset in azimuth relative to the first guide profile 66;
- a third guide profile 68 which forms a radialisation ramp ensuring transition between the first non-radialised flat section and the second radialised flat section, and able to force the circumferential movement of the finger 62, 63, 64, 65 and hence the rotation of the flange 11, 12, by converting into rotational torque the axial thrust force exerted by the axial drive motor M13 on the finger 62, 63, 64, 65 during the axial convergence of the flanges 11, 12 necessary for shaping of the tire 2;
- and a fourth guide profile 69 which, in the direction of shaping i.e. in the direction of a reduction of the center distance dZ, limits the possible amplitude of the azimuthal rotation of the finger 62, 63, 64, 65 in order to prevent the flange 11, 12 from operating an excessive free rotation which would bring the angular difference dA out of the permitted region DdA, here across the upper boundary DdA_max. Advantageously, in the reverse direction, i.e. in the return direction, when the flanges 11, 12 move axially apart in order to return the drum 10 to its initial configuration so as to allow production of a new tire 2, the fourth guide profile 69 forms a re-initialization ramp providing the transition between the second flat section and the first flat section, and to this end is able to force, by converting the axial thrust force exerted by the axial drive motor M13 moving the flanges apart from one another, the rotation of the finger 62, 63, 64, 65 and hence of the flange 11, 12 in a direction opposite the rotation direction which allowed radialisation, in order to bring the finger and the flange back to their initial angular position.

In practice, the first and third guide profiles 66, 68 correspond to the low boundary DdA_min of the permitted region DdA, while the second and fourth guide profile 6769 correspond to the high boundary DdA_max.

As visible in particular on FIG. 3, the third guide profile 68 forming a ramp preferably follows a helical course relative to the central axis Z10, with a helix angle B68 which may lie between 1 degree and 45 degrees, preferably between 2 degrees and 30 degrees, for example between 5 degrees and 20 degrees.

Similarly, the fourth guide profile 69 forming a ramp preferably follows a helical course relative to the central axis Z10, with a helix angle B69 which may lie between 1 degree and 45 degrees, preferably between 2 degrees and 30 degrees, for example between 5 degrees and 20 degrees.

The helix angle B69 of the fourth helical profile 69 may be equal to or in some cases strictly greater than the helix angle B68 of the third helical profile 68.

Also, the fourth guide profile 69 is preferably axially offset relative to the third guide profile 68 so as to give the effect of progressive variation of the amplitude H_Dda of the permitted region and hence the bulge in the permitted region DdA as described above.

The third guide profile 68 and/or the fourth guide profile 69 may be shaped so as to initiate a proportional, linear relationship between the axial position and the angular position, or a non-linear relationship reflecting a curved boundary DdA_min, DdA_max of the permitted region DdA, for example a boundary curved in an S-shape as described above.

Preferably, the device 1, and more particularly the drum 10, has two mechanical guides 60, one for each flange 11, 12. Preferably, the guides may have a substantially symmetrical arrangement such that the groove of the first guide 60 is configured to rotationally deflect the first flange 11 in one direction while the groove of the second guide 60 is configured to rotationally deflect the second flange 12 in the opposite direction.

Naturally, as the rotational course and hence the resulting angular difference dA are thus divided over two guides 60, the dimensions of each guide 60 are adapted accordingly, together with the individual amplitude of the angular displacement RA authorized by each guide for the flange 11, 12 concerned, such that the total angular displacement RA over both guides 60 corresponds to the total permitted region DdA as defined by the control law L40.

Of course, naturally a single guide 60 could be provided in order to apply the control law L40 to only one of the first and second flanges 11, 12, without leaving the scope of the disclosure.

Preferably, the guide 60 takes the form of a removable plate carried by the shank 14, so that the guide 60 can easily be changed as a function of the model of tire 2 to be shaped. The device 1 may thus comprise a set of interchangeable plates forming a number of mechanical guides 60 adapted to the same number of different tires 2.

Figure 7:
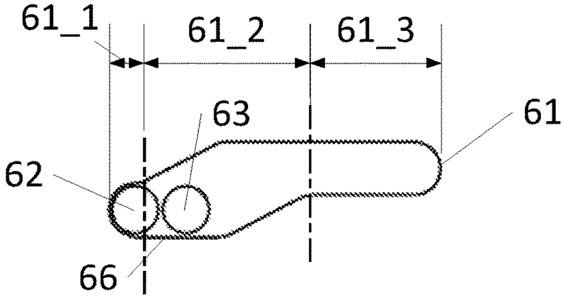
FIG. 7 is a schematic view of the mechanical guide cooperating with two fingers associated with a flange, in the initial configuration of FIGS. 5 and 6, and in a first blocking configuration which prevents rotation of the flange.
Figure 12:
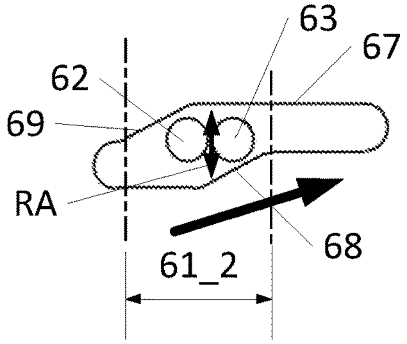
FIG. 12 is a schematic view of the mechanical guide and fingers in the intermediate configuration of FIG. 11, in which the fingers are floating between the two opposite side edges of the groove which constitute the boundaries of the permitted region.
Figure 13:
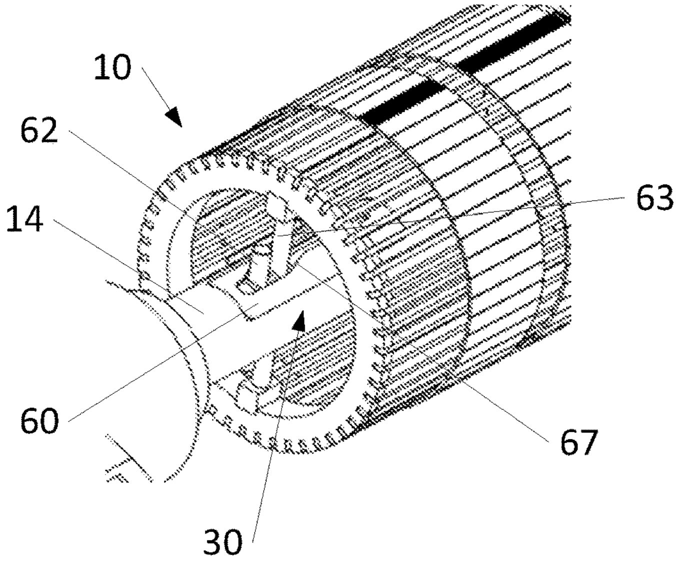
FIG. 13 is a detail, perspective view of the device from FIGS. 11 and 12, in which the first flange has been removed to reveal the fingers cooperating with the mechanical guide.
Figure 15:
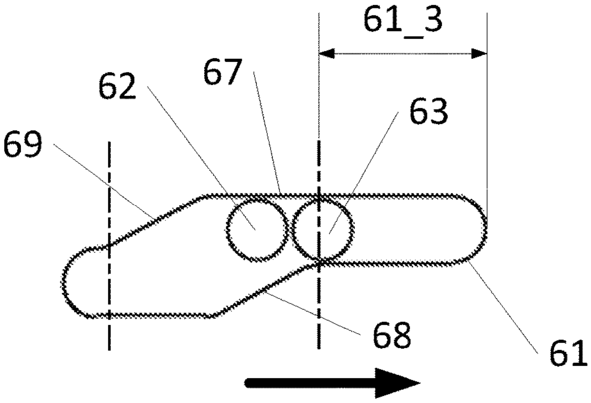
FIG. 15 is a schematic view of the mechanical guide and fingers in the final configuration of FIG. 14.
Figure 17:
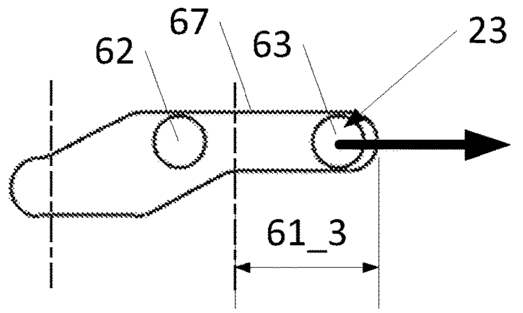
FIG. 17 is a schematic view of the mechanical guide and fingers in the deployment configuration of FIG. 16, in which the fingers have been moved axially apart from one another so as to provoke the pivoting of the arms.

Preferably, and as shown on FIGS. 3, 7, 10, 12, 15 et 17, the guide groove 61 axially has a succession of several portions 61_1, 61_2, 61_3 comprising, in the direction corresponding to the direction of axial convergence of the flanges 11, 12:

- a first portion 61_1 forming a blocking portion, within which the finger 62, 63, 64, 65 and hence the corresponding flange 11, 12 are blocked in rotation in a first angular position called the "initial angular position", which corresponds to an initial configuration in which the tire 2 has a substantially cylindrical form, as illustrated in FIG. 7;
- then a second portion 61_2 forming a release portion within which the finger 62, 63, 64, 65 and hence the flange 11, 12 are free in rotation over an angular displacement RA corresponding to that provided by the amplitude of the permitted region H_DdA, as illustrated in FIG. 12;
- then a third portion 61_3 forming another blocking portion within which the finger 62, 63, 64, 65 and hence the flange 11, 12 are blocked in rotation in a second angular position different from the first, called the "final angular position", which corresponds to a final configuration in which the tire 2 has the desired toroidal form, as illustrated in FIGS. 15 and 17.

Advantageously, the first portion 61_1 may thus fulfil the first above-described blocking function F_lock_1 in order to keep the device 1, and more particularly the drum 10 and the flanges 11, 12 in the initial configuration which is characterized by a center distance equal to the initial center distance dZ_init and an angular difference equal to the initial angular difference dA_init, and which allows flat assembly of the tire 2 (FIGS. 6 and 7).

Similarly, the third portion 61_3 fulfils the second blocking function F_lock_2 allowing the flanges 11, 12 to be kept precisely in the final configuration with radialised reinforcing threads (FIGS. 14, 15, 16, 17, 18).

For example, the second portion 61_2 offers the flange 11, 12 concerned an angular displacement RA which may preferably amount to at least 2 degrees, at least 3 degrees, even at least 5 degrees, and being preferably less than 30 degrees, or less than 15 degrees, or less than 10 degrees.

In practice, if two guides 60 are used which are each associated with a flange 11, 12, the angular displacement RA offered by each guide 60 at each center distance value dZ concerned may represent substantially or precisely half the amplitude H_DdA of the permitted region as defined for the center distance value dZ concerned.

According to a possible variant embodiment, two fingers 62, 63, 64, 65 may be associated with each flange 11, 12, the two fingers being preferably captive in the same guide groove 61, as visible in particular on FIGS. 4, 5, 7, 10, 12, 15 and 17.

The two fingers 62, 63 of the same flange 11 are preferably both rotationally fixed to the flange 11 such that they both contribute to the application of the control law L40, but under certain conditions could be axially spaced apart from one another in order to force and control the pivoting deployment of the arms 20, as illustrated on FIGS. 16, 17 and 18.

To this end, the third portion 61_3 of the guide groove 61 may advantageously form a straight slide rail parallel to the central axis Z10, which extends the guide groove 61 so as to allow continuation of the translation of the second finger 63 relative to the first finger 62 while blocking the rotation of the flanges in accordance with the final angular difference dA_final.

Since the second finger 63 is preferably held on the ring 24 while the first finger 62 is held on the first flange 11, and hence on the body relative to which the ring 24 can slide, the axial translational movement of the second finger 63 relative to the first finger 62 within the guide groove 61 causes an equivalent axial translational movement of the ring 24 on the first flange 11, and hence the pivoting of the arms 2 towards the outside, as illustrated on FIGS. 16, 17 and 18.

It is also noted that, depending on whether the control law L40 is electronic or mechanical, different advantages can be obtained.

Thus the use of a mechanical guide 60 allows simplification of the device 1 and the drum 10, since in particular it dispenses with motors M30 which would be specifically dedicated to managing the rotation of the flanges 11, 12. Use of a mechanical guide 60 also offers a particularly robust and precise solution, in particular for ensuring the rotational blockage of the flanges 11, 12 before shaping, during flat assembly of the carcass block, then after shaping, in particular during laying of the crown block and/or during rolling of the tire sidewalls.

However, it is necessary to change the mechanical guide 60 when changing the dimensions and more generally the model of the tire 2 to be produced.

Also, on use of a mechanical guide 60 with a guide rail 61 as described above, the return of the flanges 11 to the initial axial position is also accompanied by a return of the flanges to the initial angular position. The rotational movements of the flanges 11, 12 are thus always performed in the same, relatively restricted angular sector, repeatedly over the production cycles, which may favor the occurrence of localized wear on the flanges 11, 12, the shank 14 or the bearings supporting these elements.

However, use of an electronic control law L40 allows simple adaptation to the different models of tire 2 by reprogramming or changing the parameters of the control law L40, or by downloading the control law L40 from a library containing multiple predefined control laws L40.

Use of an electronic control law L40 will also allow use, as an angular origin for the start of the new cycle, of the angular position of the flanges reached by the flanges 11, 12 in the final angular configuration of the preceding cycle, without the need to return to the original angular position used in the preceding cycle. Each new production cycle can thus be performed in an angular sector of the flanges 11, 12 and shank 14 which is offset relative to the angular sector covered during the preceding cycle. Thus by angular increments of the origin of the angular setpoint during successive cycles, the stresses and wear can be distributed substantially evenly over the entire periphery of the flanges 11, 12, the shank 14 and their respective bearings, thus contributing to extending the life of these mechanical elements.

Naturally, the disclosure also relates to a method for shaping a tire 2, and more particularly a tire 2 with polarized crown.

The method comprises a convergence step during which a first flange 11 carrying a first bead 3 of the tire 2 and a second flange 12 carrying a second bead 4 of the tire are brought axially closer together in order to modify the distance axially separating the flanges, called the "center distance" dZ, so that the tire 2 passes from an initial, substantially cylindrical configuration to a final toroidal configuration.

The axial convergence, which is reflected in a progressive and continuous reduction of the center distance dZ, is generated by the motor M13 which drives the translation mechanism 13 acting on the flanges 11, 12.

According to the disclosure, during the step of axial convergence, the relative azimuthal angular position of the first flange 11 relative to the second flange 12, called the "angular difference" dA, is measured, and the rotation of the first flange 11 and/or the second flange 12 around the central axis Z10 common to the flanges 11, 12 is controlled by implementing a control law L40.

According to a possible embodiment of the method, the control law L40 is programmed in electronic form, preferably in the form of numerical data, to allow electronic management of one or more motors M13, M30 actuating the first and/or the second flange 11, 12 in rotation.

In absolute terms, the mechanical energy necessary for the assistance with rotation could be indirectly obtained by drawing the energy from a drive motor M13 serving to (also) actuate the translation mechanism 13 ensuring the axial convergence of the flanges 11, 12. However, preferably, the mechanical energy necessary for assistance with rotation is obtained directly by activating, to this end, one or more motors M30 specifically dedicated to the rotation of the flanges 11, 12.

According to another possible implementation of the method, the control law L40 is implemented by means of a mechanical guide 60 provided with a guide groove 61 which cooperates with a finger 62, 63, 64, 65 fixed to one of the flanges 11, 12.

In all cases, whatever form—electronic or mechanical—assumed by the control law L40, the control law L40 comprises a conditional assistance mode in which, over a first predetermined center distance range called the "first application region" DI, the control law L40 associates with each center distance value dZ of the first application region DI a range of permitted angular differences, called the "permitted region" DdA, which has a predetermined amplitude H_DdA delimited by a low boundary DdA_min and a high boundary DdA_max; then in which, if the measured angular difference dA lies inside the permitted region DdA, the first flange and the second flange 11, 12 are allowed to rotate freely relative to one another under the effect of the natural reaction of the tire 2 to the radial expansion of the tire and to the mutual axial convergence of the flanges 11, 12, and if the angular difference dA reaches one of the boundaries DdA_min, DdA_max of the permitted region or leaves the permitted region DdA, selectively assistance with rotation is triggered in order to actively manage the relative rotation of the flanges 11, 12 so as to force the measured angular difference dA to remain in or return within the permitted region DdA.

Thus the assistance is activated if and only if the angular difference dA actually found deviates sufficiently from the desired values, and in particular from the optimal theoretical development curve 41, to leave the pre-established permitted region DdA.

Preferably, initially, the device 1 and the tire 2 are in an initial configuration which allows the drum 10 to receive the components of the carcass block of the tire 2, in a straight cylindrical configuration called "flat configuration". This initial configuration corresponds to an initial operating point (dZ_init, dA_init). In this initial configuration, the first flange 11 and the second flange 12 are axially spaced by an initial center distance dZ_init, and blocked in rotation relative to one another so as to have an initial angular difference dA_init which is preferably zero by convention (FIGS. 4, 5, 6, 7, 8).

In the case of an electronic control law L40, the first blocking function F_lock_1 is active.

Figure 8:
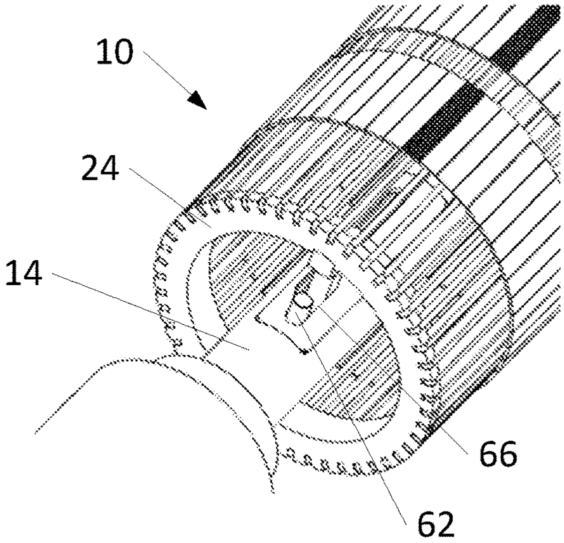
FIG. 8 is a detail, perspective view of the device from FIGS. 6 and 7, in which the first flange has been removed to reveal the fingers cooperating with the mechanical guide.

In the case of a mechanical control law L40, at least one finger, here the first finger 62 or 64 respectively of each flange 11, 12, is engaged in the locking portion 61_1 of the guide groove 61 of the guide 60 associated with the flange concerned (FIGS. 6, 7, 8).

The first phase of the control law L40 preferably allows unlocking of the rotation of the flanges 11, 12 so as to authorize a relative free rotation of one flange relative to the other.

If an electronic control law L40 is used, this unlocking phase may be achieved by deactivating the first blocking function F_lock_1, which sends a release signal, for example to unlock a latch or release a brake which blocks rotation of one and/or the other of the flanges 11, 12, here preferably the rotation of the flange 11, 12 relative to the drum 14.

Figure 9:
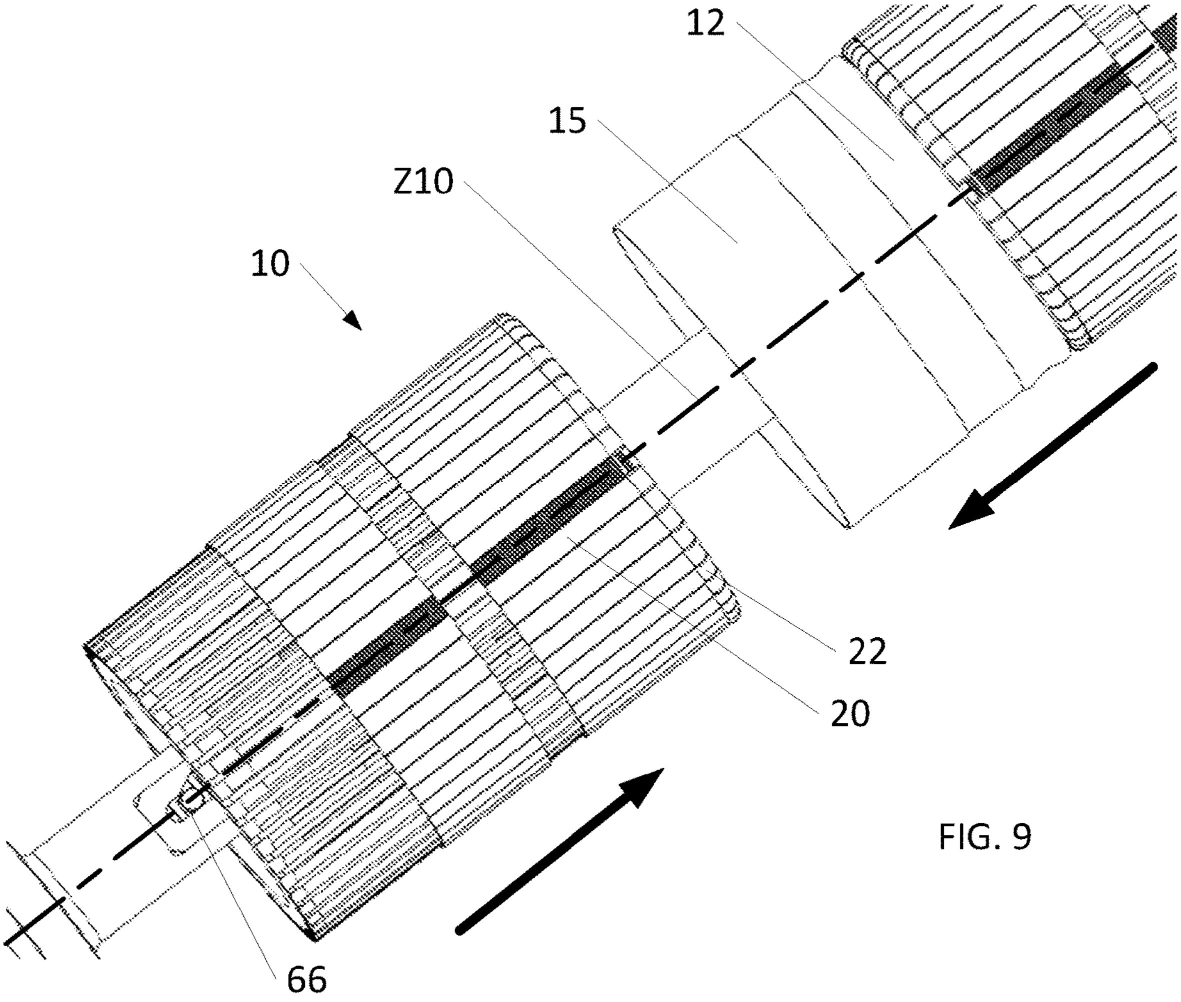
FIG. 9 illustrates from above a first shaping phase in which the finger associated with the flange is axially withdrawn from the blocking position and enters the application region of the conditional assistance mode.
Figure 10:
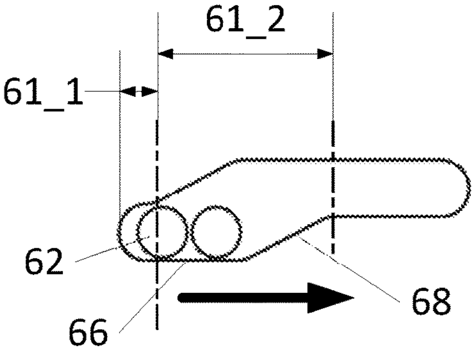
FIG. 10 is a schematic view of the mechanical guide and fingers in the configuration of FIG. 9.
Figure 11:
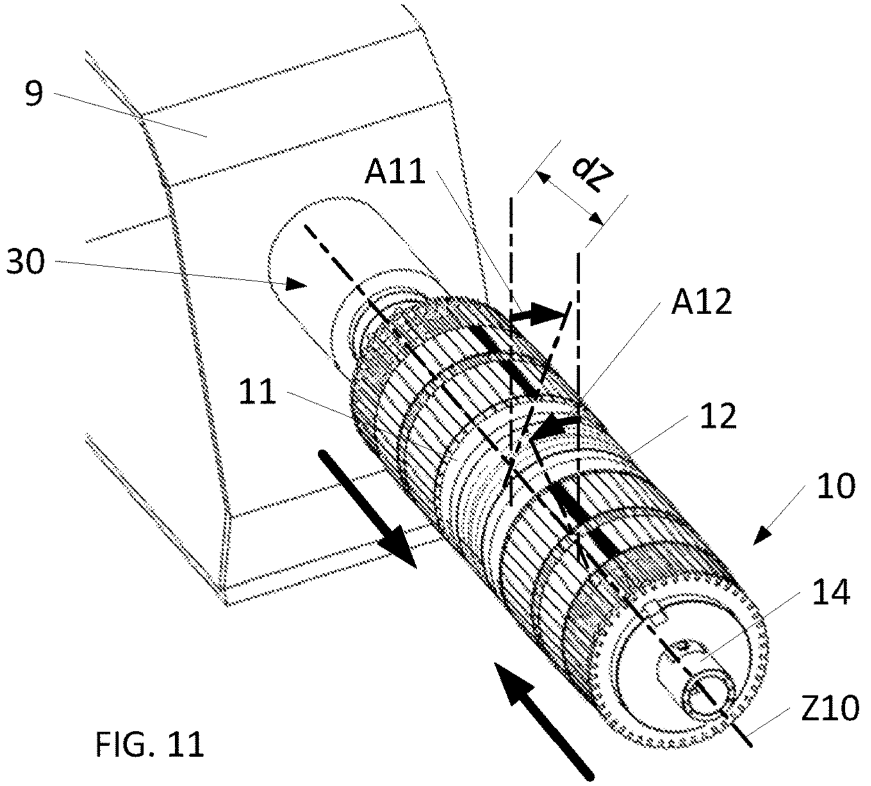
FIG. 11 shows in perspective view the shaping device of FIGS. 2, 4, 5 and 6 in an intermediate configuration during the shaping operation, in which the flanges have been brought axially closer together such that the center distance value lies within the application region of the conditional assistance mode, and the flanges have pivoted in rotation while here retaining an angular difference compliant with the region permitted by the control law.

If a mechanical control law L40 is used, this unlocking phase may be accomplished by triggering the axial translation of the flange 11, 12 concerned until the first finger 62 or 64 withdraws from the blocking portion 61_1 of the guide groove 61 (FIGS. 9, 10).

The axial convergence of the flanges, and hence the reduction in center distance dZ, continues until reaching first application region DI of the control law L40, which allows a certain freedom of angular displacement for the flanges 11, 12.

In the case of an electronic control law L40, by means of any suitable sensor, the values for the center distance dZ and also the angular difference dA are monitored, and by means of the computer 50 the actual operating point (dZ, dA) thus measured is compared with the applicable permitted region DdA as defined by the control law L40. The free rotation of the flanges 11, 12 is permitted if the operating point (dZ, dA) is clearly situated inside the permitted region DdA, and otherwise assistance is triggered to bring the operating point (dZ, dA) back to the permitted region DdA, for example by activating a rotational assistance motor M30 as described above.

In the case of a mechanical control law L40, rotation of the flanges 11, 12 remains free between the side edges forming the guide profiles 66, 67, 68, 69 of the guide groove 61 (FIGS. 12, 13), and more particularly the second portion 61_2 of the guide groove 61, as long as none of the (here two) fingers 62, 63 of the flange 11, 12 concerned comes into contact with one of the profiles, i.e. as long as the flange 11, 12 spontaneously respects the permitted region. If one of the fingers 62, 63 of the flange comes into contact with one of the guide profiles 66, 67, 68, 69, this means that a boundary of the permitted region DdA has been reached and rotation of the flange, and more particularly its angular deviation per axial progression unit, is then constrained by the course of the guide profile 66, 67, 68, 69 which forms a circumferential stop against the fingers 62, 63.

For example, if the second finger 63 comes into contact with the third guide profile 68, the second finger 63, and hence the flange 11 and first finger 62 with it, will be angularly deflected in step with their axial advance, thus leaving the first guide profile 66 corresponding to the flat non-radialised configuration, until coming to stop against the second guide profile 67 corresponding to the radialised toroidal configuration.

Whether an electronic or a mechanical control law L40 is used, the axial convergence of the flanges 11, 12 continues, passing through the first application region DI over the entire length and where applicable triggering assistance if necessary and only insofar as the assistance is necessary.

In this way, the final configuration is reached which is characterized by the final operating point (dZ_final, dA_final) and in which the tire 2 has the desired toroidal form with suitably radialised sidewall reinforcing threads.

Figure 14:
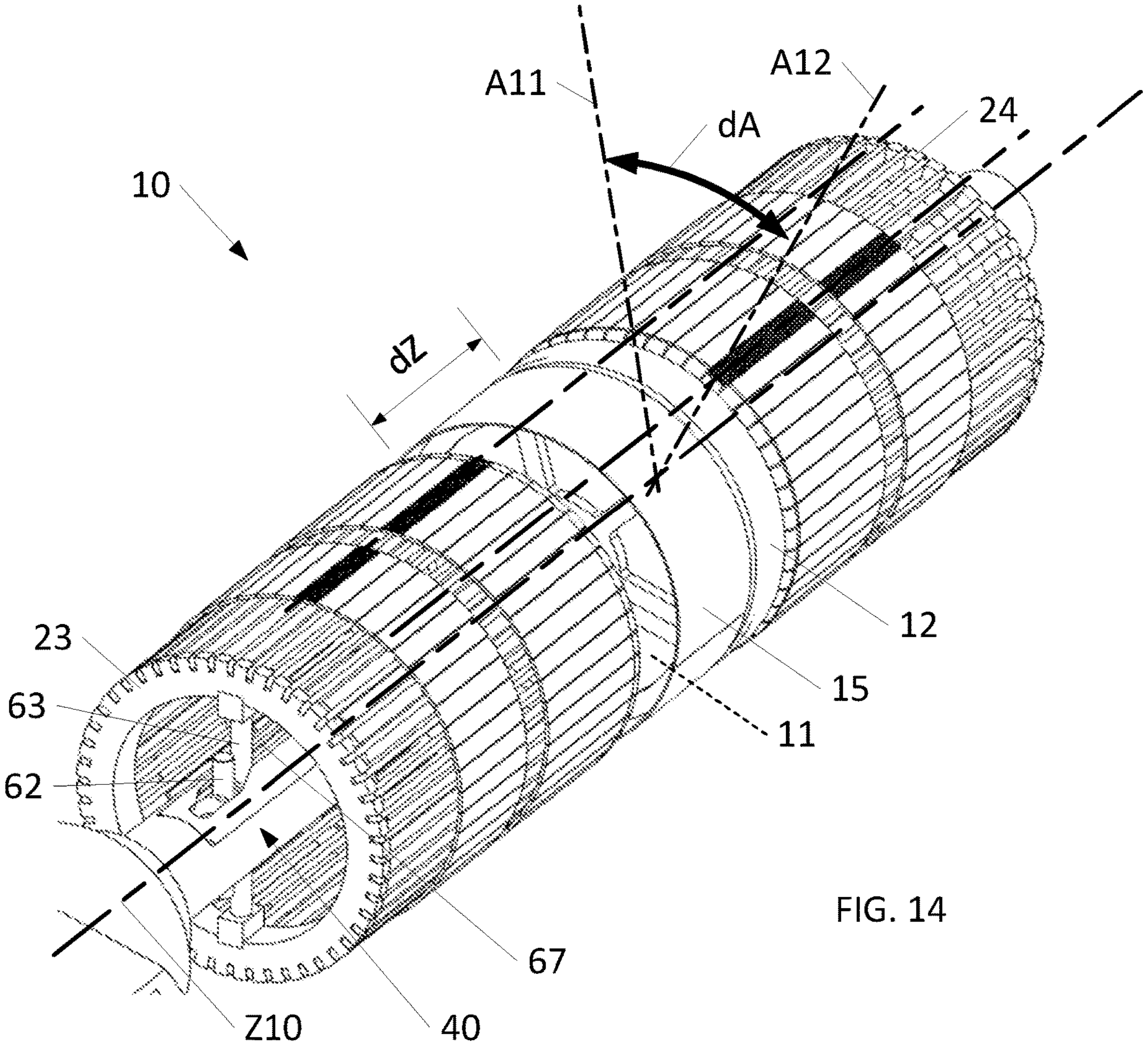
FIG. 14 illustrates, in perspective exploded view, the device in FIGS. 4, 5, 6 and 11 in a final configuration at the end of the shaping operation, in which a finger associated with the flange has reached a stop against the groove of the mechanical guide and is engaged in an axial extension of the groove, which blocks the rotation of the flange in the desired angular position.

Preferably, the angular difference dA of the flanges 11, 12 is then fixed by activating the second blocking function F_lock_2 if the control law L40 is electronic, or automatically because the second finger 63, 65 of the flange 11, 12 engages in the third portion 61_3 in the case of use of a mechanical guide 60, wherein the third portion 61_3 (like the first portion 61_1) has a width just necessary and sufficient (apart from a sliding play) to block the rotation of the finger 63 concerned in both directions (clockwise and anticlockwise) and only allow translation of the finger (FIGS. 14, 15).

The crown block can then be laid on the carcass block, then the arms 20 carrying the rollers 22 can be deployed and thus the sidewalls rolled (FIGS. 16, 17, 18).

The control system 40 and more particularly the computer 50 may to this end use any suitable deployment mechanism 23, for example an annular ram on the flange 11, 12 which pushes the ring 24, 25, causing it to slide along the flange 11, 12, or by continuing the axial movement of the second finger 63, 65 associated with the flange 11, 12 in the extension of the third portion 61_3 of the guide groove 61 (FIG. 17), in order to move the ring 24, 25.

Once the crude tire 2 is complete, the arms 2 may be retracted and the flanges 11, 12 returned to the initial configuration.

In the case of a mechanical guide 60, substantially the same path is used for return as that used for the shaping process, but in the reverse direction, and each flange 11, 12 by design returns to an axial position and angular position which are identical to those which the flange 11, 12 occupied before shaping.

In the case of an electronic control law L40, simply an axial return of the flanges 11, 12 could be applied so as to return to the initial center distance dZ_init, but without necessarily returning to the initial angular position of each flange, since the value of the angular difference dA measured could be arbitrarily re-initialized, and hence the angular position occupied by the flanges 11, 12 at the end of the preceding shaping cycle could be considered as the new angular origin of the next shaping cycle.

Of course, the disclosure is in no way limited only to the variant embodiments described above, and a person skilled in the art could in particular isolate or freely combine the abovementioned features, or replace them with equivalents.

What is claimed is:

1. A device for shaping a tire, comprising a first flange intended to receive a first bead of a tire; a second flange intended to receive a second bead of said tire; a translation mechanism allowing movement of at least one of the first flange and the second flange in translation along a common central axis in order to modify a center distance which axially separates the first flange from the second flange, so that the flanges can be brought axially closer together and hence the beads closer together, to accompany a radial expansion of the tire; a rotation mechanism which allows rotation of at least one of the first flange and the second flange around the central axis so as to allow modification of an angular difference which is the relative azimuthal angular position of the first flange relative to the second flange; wherein said device comprises a control system configured to apply a control law which comprises a conditional assistance mode in which i) over a first application region, the control law associates with each center distance value of a permitted region a range of permitted angular differences, which has a predetermined amplitude delimited by a low boundary and a high boundary separate from the low boundary; and in which ii) when a mutual axial convergence of the flanges is performed and the center distance thus passes through the first application region, the rotation mechanism remains passive if the angular difference lies inside the permitted region, so as to allow the first flange and the second flange to rotate freely relative to one another under the effect of a natural reaction of the tire to the radial expansion of said tire and to the mutual axial convergence of said flanges, and said rotation mechanism selectively triggers an assistance with rotation if the angular difference reaches one of the boundaries of the permitted region or leaves said permitted region, in order to actively manage the relative rotation of the flanges so as to force the angular difference to remain in or return within said permitted region, wherein the control law is realized as a mechanical guide comprising a guide groove holding by engagement a finger fixed to one of the flanges, side edges of which guide groove form, against said finger, guide profiles allowing an axial movement of said finger on modifications of the center distance while forming the boundaries of the permitted region in azimuth around the center axis, so as firstly to offer said finger and hence the corresponding flange, in each of the axial positions of said finger and hence of said flange, an angular displacement which corresponds to the amplitude of the permitted region for the axial position concerned, and secondly to retain said finger within the permitted region by forming circumferential stops against the azimuthal rotation of the finger and hence of the corresponding flange when said finger reaches an azimuthal position which corresponds to one of the boundaries of said permitted region.

2. The device according to claim 1, wherein the amplitude of the permitted region varies as a function of the center distance.

3. The device according to claim 1, wherein the first application region covers at least 50% of a total center distance interval described by the center distance during a total axial travel of the flanges which is necessary to cause the tire to pass from an initial substantially cylindrical configuration to a final configuration corresponding to a desired toroidal form.

4. The device according to claim 1, wherein the permitted region defined by the control law has an amplitude which firstly increases while the center distance reduces over a first portion of the first application region, which is situated towards and includes an initial center distance corresponding to an initial substantially cylindrical configuration of the tire, then decreases over a second portion of the first application region which is situated towards or even includes a final center distance corresponding to a final toroidal configuration of the tire, such that the angular difference converges towards a target final angular difference corresponding to a desired angular difference in the final configuration.

5. The device according to claim 1, wherein the control law comprises at least one rotational blocking function and comprises two rotational blocking functions, selected from: i) a first rotational blocking function which allows blocking of the relative rotation of the flanges in an initial configuration corresponding to an initial center distance value or a range of center distance values which precedes the first application region and in which the tire has a cylindrical form before a shaping operation, and ii) a second rotational blocking function which allows blocking of the relative rotation of the flanges in a final configuration corresponding to a final center distance value or a range of center distance values which follows the first application region, and in which the tire has a desired toroidal form after completion of the shaping operation.

6. The device according to claim 1, wherein the guide groove axially has a succession of multiple portions comprising, in a direction corresponding to a direction of axial convergence of the flanges: a first portion forming a blocking portion, within which the finger and hence the corresponding flange are blocked in rotation in an initial angular position which corresponds to an initial configuration in which the tire has a substantially cylindrical form; then a second portion forming a release portion within which the finger and hence the flange are free in rotation over an angular displacement corresponding to that provided by the amplitude of the permitted region; then a third portion forming another blocking portion within which the finger and hence the flange are blocked in rotation in a final angular position which corresponds to a final configuration in which the tire has a desired toroidal form.

7. The device according to claim 1, wherein the amplitude of the permitted region offers the flanges a relative angular displacement with the angular difference amounting to at least 2 degrees and less than 30 degrees.

* * * * *